United States Patent

Schivley, Jr.

[11] Patent Number: 5,324,051
[45] Date of Patent: Jun. 28, 1994

[54] FLUID-ASSISTED DUST SEAL

[75] Inventor: George P. Schivley, Jr., Richardson, Tex.

[73] Assignee: Ingersoll-Rand Company, Woodcliff Lake, N.J.

[21] Appl. No.: 918,993

[22] Filed: Jul. 23, 1992

[51] Int. Cl.$^5$ .......................... E21B 33/00; F16J 15/40
[52] U.S. Cl. ................................... 277/59; 277/72 R; 175/209
[58] Field of Search .................... 277/3, 53, 58, 59, 71, 277/75, 79, 72 R; 175/84, 88, 209, 211

[56] References Cited

U.S. PATENT DOCUMENTS

| | | | |
|---|---|---|---|
| 980,282 | 1/1911 | Junggren | 277/72 R |
| 1,200,966 | 10/1916 | Minning | 277/72 R |
| 1,475,656 | 11/1923 | Steese | 277/71 |
| 2,730,333 | 1/1956 | Lenhart, Jr. et al. | 175/209 |
| 3,045,769 | 7/1962 | Feucht et al. | 175/211 |
| 3,800,890 | 4/1974 | Gyongyosi et al. | 175/209 |
| 3,833,070 | 9/1974 | Anderson | 175/164 |
| 3,965,998 | 6/1976 | Gyongyosi et al. | 175/209 |
| 4,270,760 | 6/1981 | Greiman | 277/3 |
| 4,321,975 | 3/1975 | Dyer | 175/206 |
| 4,605,078 | 8/1986 | Bukovitz et al. | 175/162 |
| 4,756,536 | 7/1988 | Belcher | 277/79 X |
| 4,895,205 | 1/1990 | Thompson et al. | 175/84 X |

FOREIGN PATENT DOCUMENTS

| | | | |
|---|---|---|---|
| 0155144 | 10/1904 | Fed. Rep. of Germany | 277/3 |
| 0675171 | 7/1979 | U.S.S.R. | 175/84 |

Primary Examiner—William A. Cuchlinski, Jr.
Assistant Examiner—John L. Beres
Attorney, Agent, or Firm—John J. Selko

[57] ABSTRACT

A fluid-assisted dust seal for a drill shaft includes a tubular housing, flexible seals spaced apart in the housing along its length in contact with a drill shaft therein, a fluid plenum between two adjacent seals in the housing, and a fluid inlet for admitting pressurized fluid into the plenum, to deflect the seals downwardly so as to cause fluid flow out the bottom of the seal and thereby limiting entry of dust into the housing.

4 Claims, 3 Drawing Sheets

FLUID-ASSISTED DUST SEAL

BACKGROUND OF THE INVENTION

This invention relates generally to rotary drilling rigs and more particularly to dust seals for use with drilling shafts on such rigs.

Some rotary drill rigs have a platform where the operator can stand to perform various manual functions associated with operating and maintaining the machine. The process of drilling a hole consists of rotating a bit while applying a downward force to it. The rotation and downward force is applied through a tubular element which runs from the drill rig rotary head to the bit. The tubular element must pass through the platform referred to above.

In addition, there must be some sort of dust seal in the platform to keep dust from blowing up around the circumference of the tubular element which passes through the platform.

Historically, platform dust seal designs have been passive in nature. The seals simply consisted of several layers of some flexible material. Each layer having a hole in the center and a series of radial slots to allow the bit to pass. The bit is always larger than the tubular element to which it is attached.

This arrangement would lose its effectiveness once the hole in each seal layer became worn so an annular gap existed between the layer and the tubular element. Once a gap exists dust can blow up onto the platform. Enlarging of the hole in each layer is a natural result of the dust blowing up at the seal and the rotary motion of the tubular element passing through the seal.

The foregoing illustrates limitations known to exist in present dust seals for drilling machines. Thus it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an elongated tubular housing defining an annulus around a longitudinal axis; a plurality of flexible seal members in the housing radially extending toward the axis to contact a drill shaft; spacing means for spacing apart the seal members; fluid injection means for injecting pressurized fluid into the housing for deflecting the seal members to permit fluid to exhaust out the bottom of the housing between the seal members and the shaft, thereby limiting entry of dust into the housing.

The foregoing and other aspects will become apparent from the following detailed description of the invention when considered in conjunction with the accompanying drawing figures.

BRIEF DESCRIPTION OF THE DRAWING FIGURES

FIG. 1 is a side elevational view of a drilling rig and platform having the seal of this invention thereon; and
FIG. 2 is a half cross-sectional cutaway view of the
FIG. 3 is a view along 3—3 of FIG. 2.

DETAILED DESCRIPTION OF THE INVENTION

Figure 1:
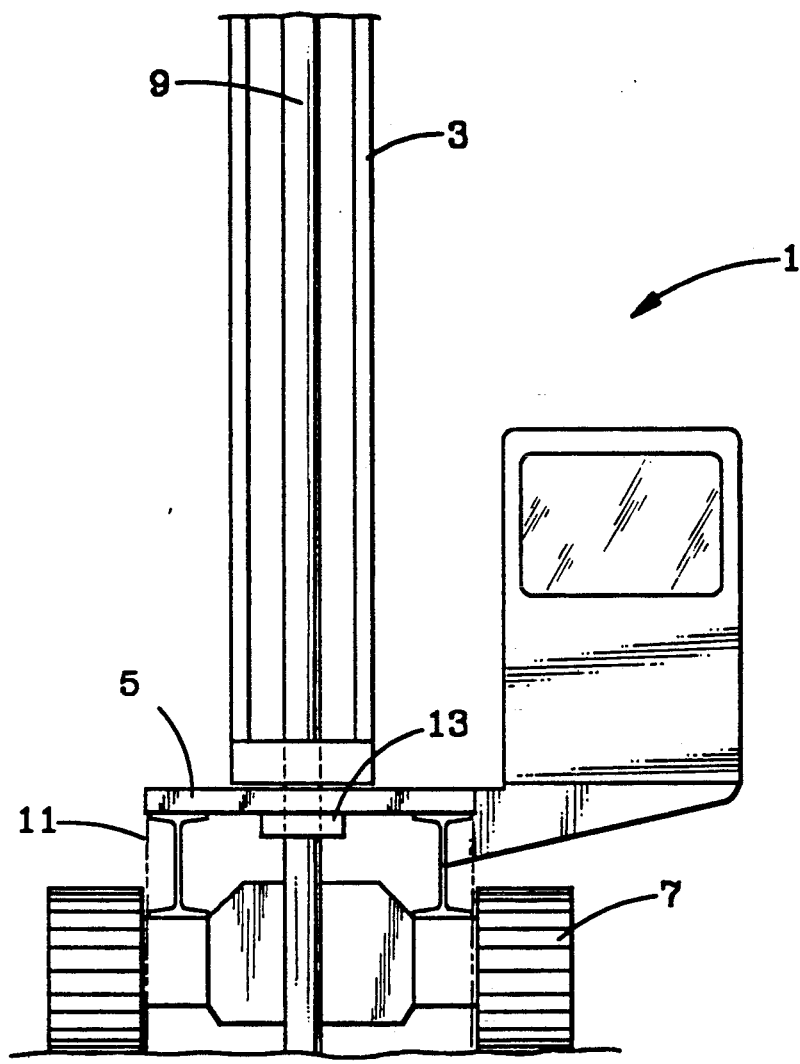

Referring to FIG. 1, there is shown a typical drilling rig 1 including a tower 3 mounted on a platform 5. The rig may or may not be mounted on a tracks 7 for mobility. Extending downwardly through tower 3 and an aperture in platform 5 is a tubular drill shaft 9. Flexible curtain 11 extends downwardly from platform 5 as is well know. The seal 13 of this invention is shown fastened to the platform 5, and extending downwardly around shaft 9, along a longitudinal axis thereof.

Figure 2:
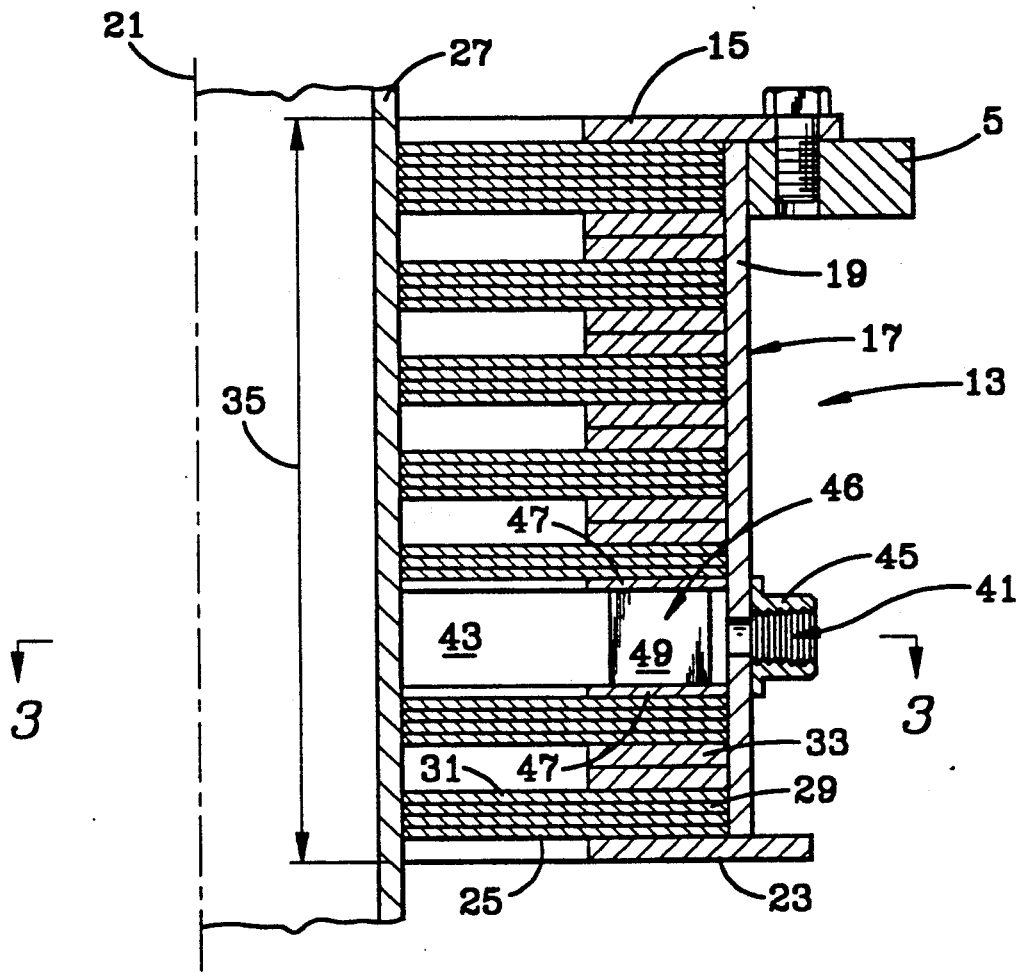
Figure 3:
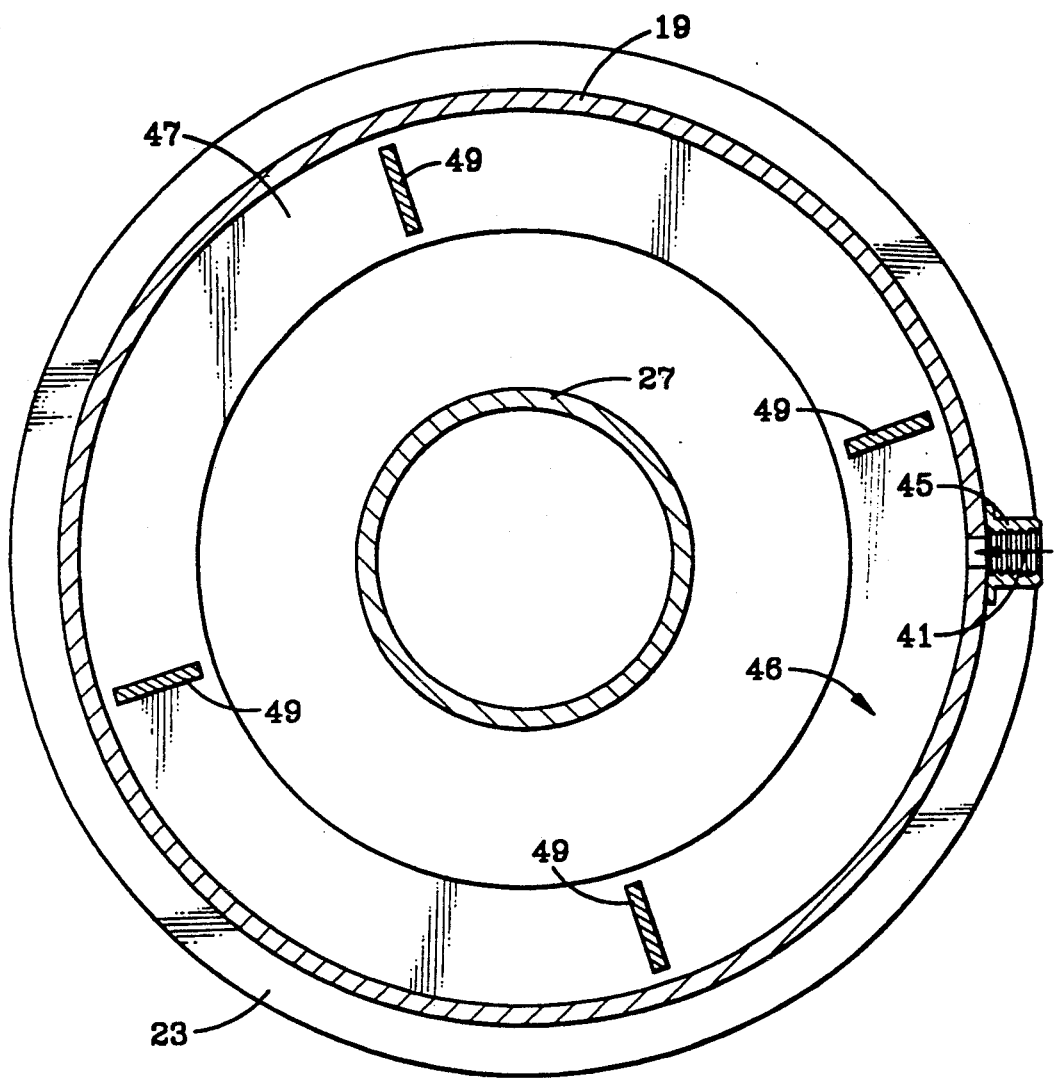

Now referring to FIG. 2, there is shown the invention 13 in more detail. The view is shown in half cross-section, so it will be understood that the elements shown will be a mirror-imaged for a full cross-sectional view.

The base plate 15 is the member of the seal assembly which sits on top of the hole in the platform 5, where the seal is located. Welded to the base plate 15 is housing 17. Housing 17 comprises an elongated tubular member having a sidewall 19 defining an annulus member around a longitudinal axis 21, and flat bottom plate 23.

Inside the housing 17 are a plurality of thin flexible seal members 25. Each member 25 extends radially from sidewall 19 toward axis 21 and forms a central aperture around axis 21, of a size to cause contact between seal member 25 and a drill shaft 27, when shaft 27 extends along axis 21. Each seal member 25 includes an outer portion 29 adjacent sidewall 19 and an inner lip portion 31 defining the central aperture through which shaft 27 passes.

Spacing members 33 in housing 17 space apart seal members 25 along length 35 of housing 17. Spacing members 33 extend radially from sidewall 19 toward axis 21 and contact seal members only on circumferential portion 29, leaving lip portion 31 unsupported for deflecting, as described hereinafter.

Fluid injection means, shown generally as 41, is provided in housing 17 for injecting pressurized fluid into housing 17, to produce a pressure inside the housing 17 that is greater than outside. Fluid injection means 41 includes a rigid plenum chamber 43 positioned between two adjacent seal members 25, and an inlet means 45 in sidewall 19 for introducing pressurized fluid into chamber 43. Plenum chamber 43 is formed by a plenum frame 46 comprising a pair of spaced apart washer-like plates 47 that are separated by a plurality of radially extending upstanding ribs 49 therebetween. Plates 47 contact seal members 25 on the outer portion 29, leaving lip portion 31 unsupported for deflecting.

It will be understood that fluid flow can take place between plates 47 by reason of the fact that ribs 49 extend radially and do not thereby obstruct flow. Plenum 43 is positioned along the length 35 of housing 17 to cause a greater volume of fluid flow downwardly through housing 17 than upwardly therethrough. This is accomplished by positioning plenum 43 along the length 35 of housing 17 so that more seal members 25 are positioned above plenum 43 than are positioned below plenum 43.

In assembling the seal 13, the seal members 25, spacing members 33 and plenum frame 46 are removably stacked into housing 17 in a force-fit arrangement. This removability provides ease of replacement of elements. I prefer to provide flexible seal members 25 from any suitable elastomeric material, and spacing members 33 from any suitable rigid material. I prefer to use pressurized air for the fluid at a pressure differential of about 30 psig. or less.

The seal operates as follows: air is introduced into the plenum 43 through an appropriate fitting 45 in the cylindrical housing 17. Compressed air in the plenum 43 will now cause the flexible seals 25 to deflect and fluid flow, both up and down, will occur. The location of the plenum 43 is selected so as to provide the desired flow distribution; e.g.: down versus up. The preferred flow distribution is one where the majority of the volume of flow will be downward and therefore produce an annular air jet issuing from the lowest flexible seal member 25. This air jet will act against the dust being blown against the seal by the dust coming up out of the hole being drilled.

A key aspect of the design relates to the effect of the air flow on the life of the seal members 25. As the air introduced into the plenum 43 escapes, the majority of it will be passing between the tubular element (drill pipe) 27 and the lip portion 31 of each flexible seal member 25. This air flow will create a small gap and help to relieve the pressure between the flexible seal members 25 and the drill shaft 27.

Another key aspect relates to the annular jet which issues from the bottom of the seal 13. This jet will, by its very presence, act to deflect dust particles which might otherwise penetrate the seal 13 and then contribute to abrasive wear of the flexible seal members 25.

Having described the invention, what is claimed is:

1. A fluid-assisted dust seal for a drill shaft comprising:
    (a) an elongated tubular housing defining an annulus around a longitudinal axis of said housing;
    (b) a plurality of flexible seal members in said housing, each seal member extending radially toward said axis, and forming an aperture of a size to cause contact between said seal member and a drill shaft, when a drill shaft extends along said axis;
    (c) spacing means in said housing for spacing said seal members apart from each other along said housing length;
    (d) fluid injection means in said housing for injecting pressurized fluid into said housing, to create a pressure differential inside said housing that is greater than outside said housing, when a drill shaft extends along said axis;
    (e) means for mounting said housing around an opening in a drill platform;
    (f) said seal members having an outer portion adjacent a sidewall of said housing and an inner lip portion defining said aperture;
    (g) said spacing means extending radially from said sidewall toward said axis and contacting each said seal member only on said outer portion, leaving said lip portion unsupported for deflecting;
    (h) said fluid injection means further comprising:
        (i) a rigid fluid plenum chamber positioned between two adjacent seal members;
        (ii) a fluid inlet means for connecting said plenum chamber to a source of pressurized fluid; and
        (iii) said plenum chamber being positioned along the length of said housing to cause a greater volume of fluid flow downwardly through said housing than upwardly through said housing;
    (i) said plenum chamber further comprising:
        (i) an annular plenum frame having a pair of spaced-apart plates extending radially from said sidewall toward said axis, said plates separated by a plurality of radially extending upstanding ribs;
        (ii) said frame contacting said seal members only on said outer portion; and
        (iii) said plenum chamber having a greater number of seal members positioned thereabove than therebelow in said housing, whereby a majority of said fluid is exhausted out said bottom of said seal.

2. The invention of claim 1 wherein said fluid is air.

3. The invention of claim 2 wherein said seal means is elastomeric material.

4. The invention of claim 2 wherein said fluid is pressurized to a pressure of about 30 pounds per square inch, relative to outside said housing.

* * * * *